(12) United States Patent
Watanabe (10) Patent No.: US 7,397,037 B2
(45) Date of Patent: Jul. 8, 2008

(54) RADIATION IMAGE PHOTOGRAPHING APPARATUS

(75) Inventor: Tetsuo Watanabe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 11/356,014

(22) Filed: Feb. 17, 2006

(65) Prior Publication Data

US 2006/0157658 A1 Jul. 20, 2006

Related U.S. Application Data

(62) Division of application No. 10/812,867, filed on Mar. 31, 2004, now Pat. No. 7,053,379.

(30) Foreign Application Priority Data

Apr. 25, 2003 (JP) ............................. 2003-121962

(51) Int. Cl.
*G01T 1/24* (2006.01)
(52) U.S. Cl. ........................... 250/370.09; 250/370.11; 250/580; 250/581; 250/582
(58) Field of Classification Search ............ 250/370.09, 250/370.11, 580, 581, 582
See application file for complete search history.

(56) References Cited

U.S. PATENT DOCUMENTS

| | | | | |
|---|---|---|---|---|
| 4,258,264 A | | 3/1981 | Kotera et al. ................. 250/484 |
| 4,674,107 A | | 6/1987 | Urban et al. ................... 378/98 |
| 4,835,386 A | | 5/1989 | Shimura et al. .......... 250/327.2 |
| 5,331,166 A | * | 7/1994 | Crosetto et al. ........ 250/370.11 |
| 5,696,369 A | | 12/1997 | Watanabe ................... 235/454 |
| 6,025,598 A | | 2/2000 | Tago ...................... 250/370.09 |
| 6,127,250 A | * | 10/2000 | Sylvester et al. ............. 438/584 |
| 6,127,714 A | * | 10/2000 | Mochizuki .................. 257/443 |
| 6,495,836 B1 | | 12/2002 | Hata ...................... 250/370.09 |
| 6,700,126 B2 | | 3/2004 | Watanabe .............. 250/370.09 |
| 6,825,472 B2 | | 11/2004 | Endo ..................... 250/370.09 |
| 6,897,449 B1 | | 5/2005 | Hata ...................... 250/370.09 |
| 7,053,379 B2 | * | 5/2006 | Watanabe .............. 250/370.09 |
| 2001/0035502 A1 | | 11/2001 | Arakawa et al. ......... 250/484.4 |
| 2002/0005490 A1 | * | 1/2002 | Watanabe .............. 250/370.09 |
| 2002/0148949 A1 | * | 10/2002 | Sato et al. ................ 250/214.1 |

(Continued)

FOREIGN PATENT DOCUMENTS

JP 55-12429 1/1980

(Continued)

OTHER PUBLICATIONS

Machine Assisted Translation of Japanese Publication # 2003-014854, published Jan. 15, 2003.*

*Primary Examiner*—David P. Porta
*Assistant Examiner*—Casey Bryant
(74) *Attorney, Agent, or Firm*—Fitzpatrick, Cella, Harper & Scinto (57) ABSTRACT

A radiation image photographing apparatus configured to detect radiation includes a radiation detecting panel configured to convert received radiation into an electrical signal, and a support substrate configured to support the radiation detecting panel. In addition, a housing is configured to contain the radiation detecting panel and the support substrate. A plurality of openings are formed on a side of a surface of the support substrate, with the surface being opposite to a surface of the support substrate configured to support the radiation detecting panel.

12 Claims, 4 Drawing Sheets

U.S. PATENT DOCUMENTS

2004/0188626 A1  9/2004  Yamamoto ............ 250/370.09

FOREIGN PATENT DOCUMENTS

| | | |
|---|---|---|
| JP | 56-11395 | 2/1981 |
| JP | 2002-014168 | 1/2002 |
| JP | 2002-186604 | 7/2002 |
| JP | 2003-14854 | 1/2003 |

* cited by examiner

RADIATION IMAGE PHOTOGRAPHING APPARATUS

This application is a divisional of application Ser. No. 10/812,867, filed Mar. 31, 2004 now U.S. Pat. No. 7,053,379.

BACKGROUND OF THE INVENTION

1. Field of the Invention

The present invention relates to a radiation digital image photographing apparatus for photographing a radiation image by the use of a digital signal.

2. Related Background Art

Conventionally, an apparatus for obtaining a radiation image of an object by illuminating the object with radiation and detecting a distribution of the intensity of radiation transmitted through or penetrating the object has been widely used in the fields of medical diagnosis and non-destructive inspection for industry, etc. A film/screen method for radiation is known as a general method for effecting such photographing. This method is a method for effecting photographing under a condition in which a photosensitive film is combined with a fluorescent material sensitive to radiation. In this method, a sheet-shaped fluorescent member of rare-earth element capable of light emission upon its illumination with radiation is in close contact with and held on each of opposite surfaces of the photosensitive film, radiation transmitted through the object is converted into visible light by the fluorescent member, the light is captured by the photosensitive film, and a latent image formed on the film is developed by chemical treatment and visualized.

On the other hand, owing to recent advance of digital technology, use is made of a method in which after a radiation image is converted into an electrical signal and the electrical signal is image-processed, the thus-processed image is reproduced as a visible image on a CRT or the like, thereby obtaining a high-quality radiation image. In connection with such a method for converting the radiation image into the electrical signal, Japanese Patent Application Laid-Open Nos. H55-12429 and H56-11395, for example, disclose a radiation image recording and reproducing system in which after a radiation transmission image is once stored in a fluorescent member as a latent image, the fluorescent member is illuminated with stimulated light, such as laser light, to photoelectrically read the latent image, thereby outputting a visualized image of the radiation transmission image.

Further, as semiconductor process technology advances of late, there has been developed an apparatus for photographing a radiation image in a similar manner using a semiconductor sensor. Such a kind of system has a very wide dynamic range, and is capable of obtaining a radiation image that is unlikely to be influenced by fluctuation of the exposure amount of radiation, as compared with a conventional radiation photographing system which uses a photosensitive film. Further, no chemical treatment is needed, and an output image can be instantaneously obtained, differently from the conventional photosensitive film system.

Such a kind of photographing apparatus is generally settled and used in a radiation room, and its rigidity has been so far considered more important than the weight and size in a thickness direction of the radiation image photographing apparatus itself.

In recent years, however, a portable photographing apparatus, such as a so-called electronic cassette, is desired for the purposes of attaining speedy and wide-range photographing. Further, it is required in the light of advantages in the cost to establish a system in which a single photographing apparatus is mounted to a plurality of photographing supports at the same time to enable photographing of various portions.

In this case, it is desirable for operators, such as radiographic engineers, that the electronic cassette is light in weight, considering the operators' works in settling the electronic cassette at a predetermined location and transporting the electronic cassette. Further, if the size in the thickness direction of the electronic cassette is large, an object person is liable to be pained in the event that the electronic cassette is inserted into a spacing between the object person lying on a bed and the bed.

However, if the weight and thickness of the electronic cassette are reduced, a problem of reduction of its mechanical strength occurs. Furthermore, there is a possibility that some radiation penetrates the apparatus and goes outside, is then scattered by a wall, a floor and the like behind the apparatus, returns from behind the apparatus, and is finally input into a sensor in the apparatus. It is necessary to oppress such scattered radiation from behind the apparatus as much as possible, since such radiation can cause a difference in transmittance between parts of a structure in the photographing portion to be photographed in an image as a flare.

As discussed in the foregoing, a variety of appropriate measures have been desired to cope with enlarged thickness and increased weight of conventional radiation image photographing apparatuses.

SUMMARY OF THE INVENTION

It is an object of the present invention in view of the above-discussed problem to provide a radiation image photographing apparatus capable of being reduced in its thickness and weight, for example.

A radiation image photographing apparatus according to the present invention is directed to a radiation image photographing apparatus in which an object is irradiated with radiation emitted from a radiation generating unit, and a distribution of radiation penetrating the object is detected by a sensor. The radiation image photographing apparatus includes a radiation detecting panel having a detection surface on which there is arranged an optoelectrical converting device for detecting radiation penetrating the object, a support substrate for supporting the radiation detecting panel, and a housing for containing the radiation detecting panel and the support substrate. The radiation detecting panel, the support substrate, and the housing constitute a photographing portion. A surface of the support substrate for supporting the radiation detecting panel is made flat, and a recess portion having a plurality of openings are formed on a side of a surface of the support substrate, which is opposite to the surface of the support substrate for supporting the radiation detecting panel in a thickness direction. A reinforcing plate is fixed such that those recess portions can be covered therewith.

Other objects, features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

Embodiments of the present invention will be described in detail hereinafter with reference to the drawings.

Figure 1:
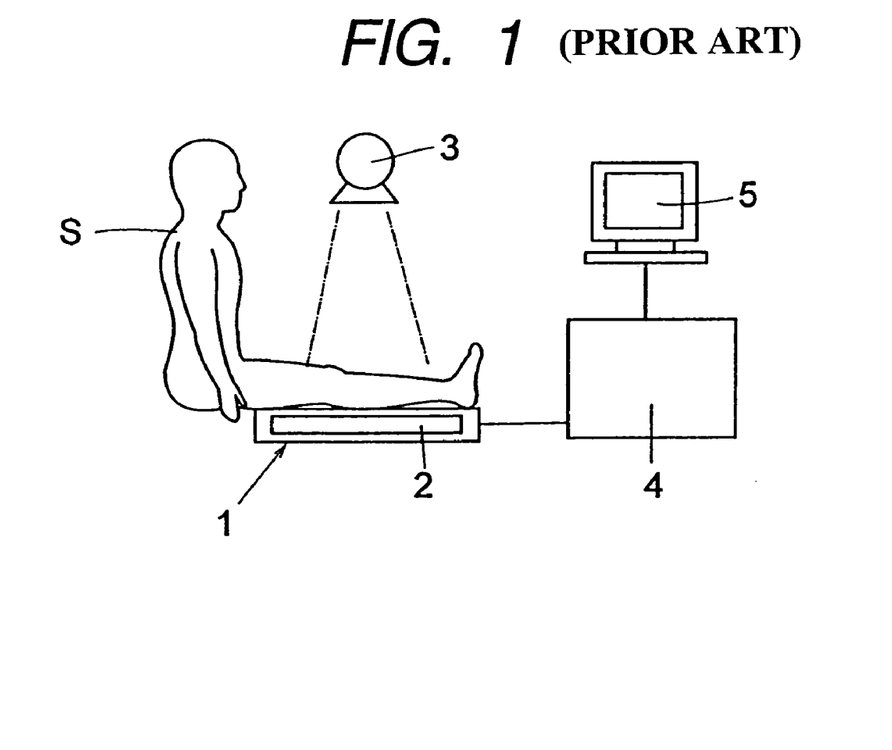
FIG. 1 is a conceptual view schematically illustrating a general system.

FIG. 1 is a conceptual view schematically illustrating a general system using such a radiation image photographing apparatus. A radiation detecting unit 2 is built in a radiation image photographing apparatus 1. A radiation generating apparatus 3 is disposed above the radiation image photographing apparatus 1. An object S is illuminated with radiation emitted from the radiation generating apparatus 3, and radiation transmitted through the object S is detected by the radiation detecting unit 2 with a two-dimensional grid-like arrangement. An image signal output from the radiation detecting unit 2 is image-processed in a digital manner by an image processing unit 4, and a radiation image of the object S is displayed on a monitor 5.

Figure 2:
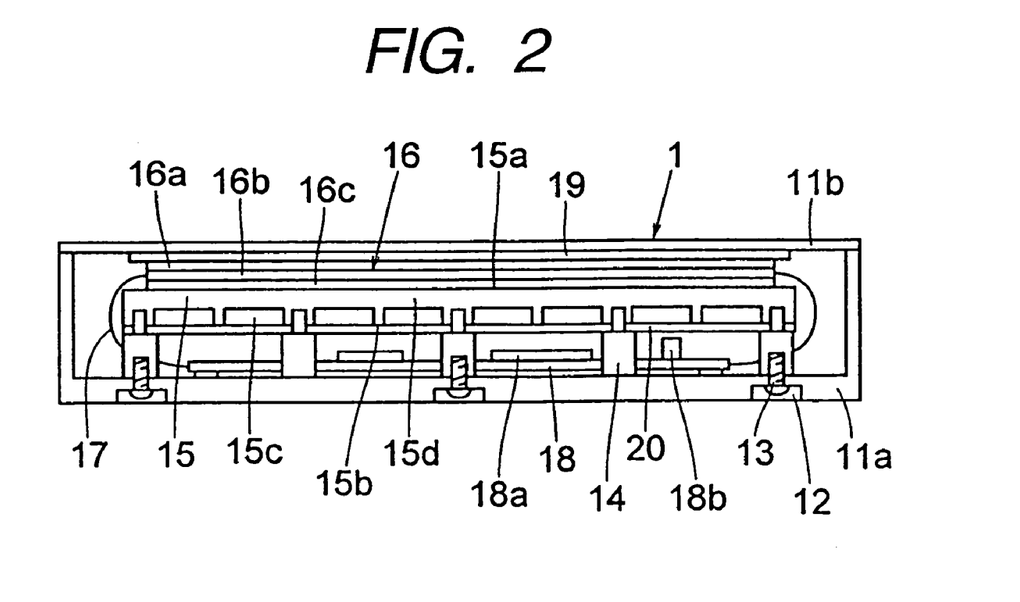
FIG. 2 is a side cross-sectional view illustrating a first embodiment according to the present invention.
Figure 3:
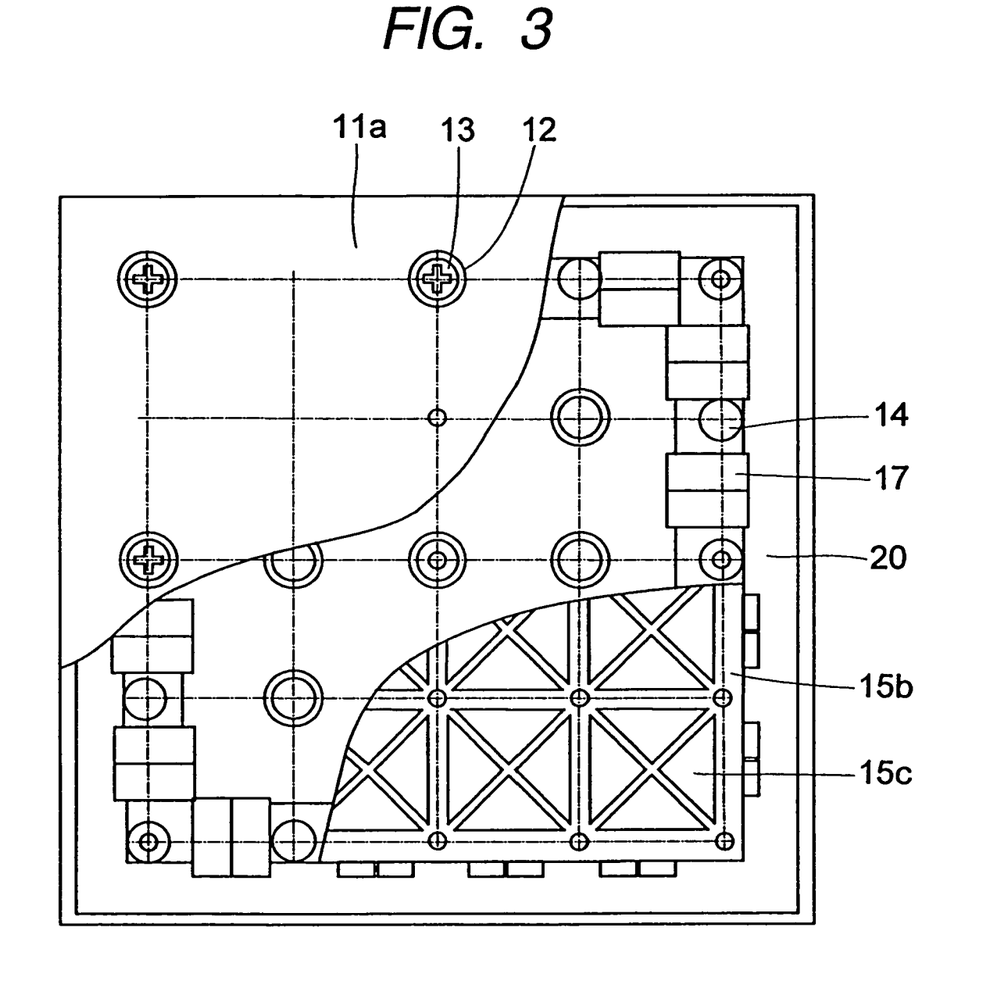
FIG. 3 is a cross-sectional view taken from a bottom side.

FIG. 2 is a cross-sectional view illustrating the radiation image photographing apparatus 1 of the first embodiment, and FIG. 3 is a cross-sectional view taken from a bottom side of the radiation image photographing apparatus 1. An upper portion of a lower housing 11a is sealed by an upper housing 11b formed of Carbon Fiber Reinforced Plastic (CFRP) which is excellent in its X-ray transmittance and physical strength. A plurality of holes 12 for setting a screw are formed at plural locations on the bottom surface of the lower housing 11a. A screw 13 is inserted in the screw setting hole 12, and a support member 14 is mounted thereby. On the support members 14, a support substrate 15 is settled. The support substrate 15 is comprised of a highly-rigid structure formed of aluminum alloy, magnesium alloy, or the like, which is light in weight and highly strong such that the structure can be protected against vibrations, shocks and so forth at the time of transportation. A radiation image detecting panel 16 is fixed to the support substrate 15 by a thin bonding layer, such as a double adhesive tape and an adhesive agent.

The radiation image detecting panel 16 is constructed by layering from an upper side a fluorescent member 16a for converting radiation into visible light, a grid-shaped optoelectric converting device 16b for converting the visible light into an electrical signal, and a substrate 16c on a surface of which the optoelectric converting device 16b is arranged. A glass substrate is often used as the substrate 16c because of necessities that it must have no chemical reaction with a semiconductor device, that it must be resistant to temperatures of semiconductor forming process, and that its size must be stable. The optoelectric converting device 16b is formed on the glass substrate 16c in a two-dimensional arrangement by a semiconductor process, and the fluorescent member 16a is comprised of a resin plate which is coated with a fluorescent material of metal compound.

The optoelectric converting device 16b is connected through a flexible circuit board 17 to a circuit board 18 which is equipped with electronic components 18a and 18b for processing the optoelectrically converted electrical signal, or controlling the drive of the radiation image detecting panel 16. Further, a space extending in a thickness direction is formed between the support substrate 15 and the lower housing 11a such that a relatively tall electrical component 18b, such as a capacitor, can be arranged on the circuit board 18. It is, however, possible to prevent an increase of the space in the thickness direction by forming a space around the side of the support member 14.

It is required for the upper housing 11b to have as high a radiation transmittance as possible such that a high S/N can be obtained without lowering the amount of radiation to be detected. On the other hand, however, the radiation detecting panel 16 needs to be protected in the event that the object rides on the upper housing 11b. For that purpose, it is required that the thickness of the radiation image photographing apparatus 1 itself be increased to improve its rigidity, or an appropriate distance be established between the radiation detecting panel 16 and the upper housing 11b. Considering those conditions, it is difficult to support load only by the upper housing 11b such that any stress cannot be applied on the radiation detecting panel 16, without any decrease in the radiation transmittance and any increase in the external size of the radiation image photographing apparatus 1. Accordingly, it is necessary to provide a load supporting structure which is resistant to load, even if the load is applied on the radiation detecting panel 16 itself.

An upper surface 15a of the support substrate 15 for mounting the radiation detecting panel 16 thereto is made flat such that the load will not be borne only by the radiation detecting panel 16. The strength of the support substrate 15 is designed such that a bending stress imposed on the radiation detecting panel 16 can fall within an allowable range even when the load is applied on the support substrate 15 from above.

Further, a buffer material 19 is interposed between the upper housing 11b and the radiation detecting panel 16, so that occurrence of a local stress on the radiation detecting panel 16 can be oppressed and dispersion of stress can be achieved by the buffer material 19 even in the event that the load is imposed on the upper housing 11b and the upper housing 11b is hence flexed.

A plurality of recess portions 15c with openings are formed on the side of a lower surface 15b of the support substrate 15. And, a planar reinforcing plate 20 is fixed such that those recess portions 15c can be covered therewith. The reinforcing plate 20 is formed of a material having high elastic coefficient and light weight, such as fiber-reinforced plastics, fiber-reinforced metal, and aluminum alloy.

As illustrated in FIG. 3, the recess portions 15c are arranged with the same shape at sections of the support substrate 15 defined by alternate long and short dash lines, respectively. The reinforcing plate 20 is fixed at corners of each section, and the support member 14 for supporting the load is mounted to each corner of each section. The reinforcing plate 20 is fixed by the use of fastening by the support member 14 and bonding to the surface 15b. The support member 14 is brought into contact with the inner surface of the lower housing 11a, and some of the support members 14 are fastened by the screws 13, respectively, as described above.

Thus, extension occurring due to the bending can be oppressed by the arrangement of the reinforcing plate 20, and load resistant capability achieved thereby can be enhanced more than that obtained by the structure having the recess portions 15c only. Further, although its strength is lower than a substrate 15 having a uniform thickness and lacking the recess portion 15c, the strength can be compensated for by shortening the distance between the support points and increasing the number of escapes for the support members 14 formed in the circuit board 18.

When a thick portion 15d is formed on the side of the upper surface 15a of the support substrate 15 as discussed above, occurrence of its deformation due to the local load can be made difficult, and at the same time the thick portion 15d can effectively serve as an electromagnetic-wave shielding material for the radiation detecting panel 16. Moreover, since the reinforcing plate 20 is mounted to the side of the lower surface 15b, but not to the side of the upper surface 15a, the fastening by the screw can be used as well as the bonding. Accordingly, the reinforcement can be effectively achieved. Owing to the use of such a reinforcing plate, it is thus possible to construct the support substrate for supporting the radiation detecting panel as a hollow structure, and achieve a thin and light apparatus. Resultantly, the load imposed on the operator and the object can be reduced, and operational conditions for the operator are improved and discomfort of the object is lightened.

Figure 4:
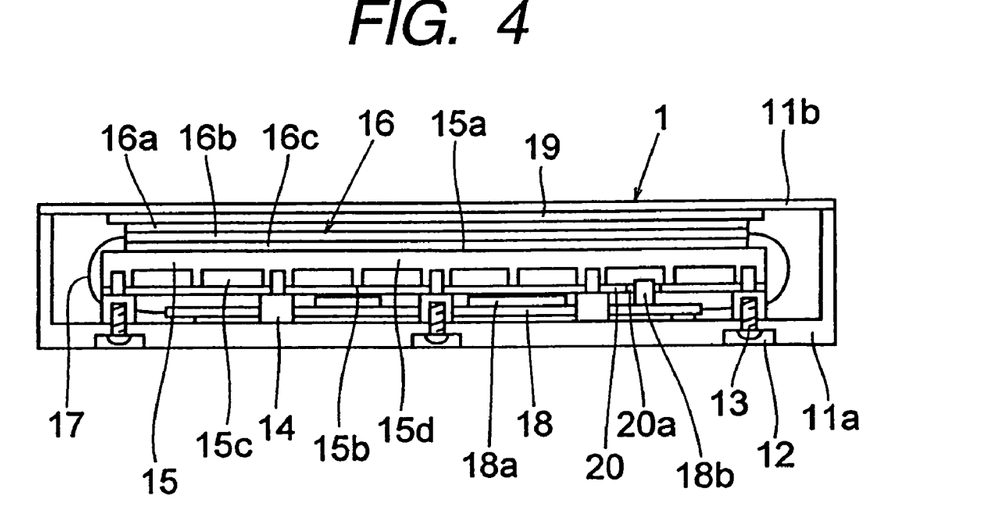
FIG. 4 is a side cross-sectional view illustrating a second embodiment according to the present invention.

FIG. 4 is a cross-sectional view illustrating a second embodiment of the present invention, in which like reference characters designate the same or similar parts of the first embodiment. In the second embodiment, an opening 20a is formed in a portion of the reinforcing plate 20 near the periphery of the support substrate 15 in which possibility of load imposition is small. Through the opening 20a, inserted into the recess 15c is a relatively tall electrical component 18b placed on the circuit board 18, such as a capacitor.

It is hence possible to shorten the size in the thickness direction, i.e., the distance between the support substrate 15 and the lower housing 11a, without largely changing the load resistant capability. The radiation image photographing apparatus can be thus made thin.

Further, the support substrate for supporting the radiation detecting panel can be constructed as a hollow structure because of the presence of the reinforcing plate, and the electrical circuit component can be contained in such a hollow portion, so that the apparatus can be thinned and lightened. Resultantly, the load imposed on the operator and the object can be reduced, and operational conditions for the operator are improved and discomfort of the object is lightened.

Figure 5:
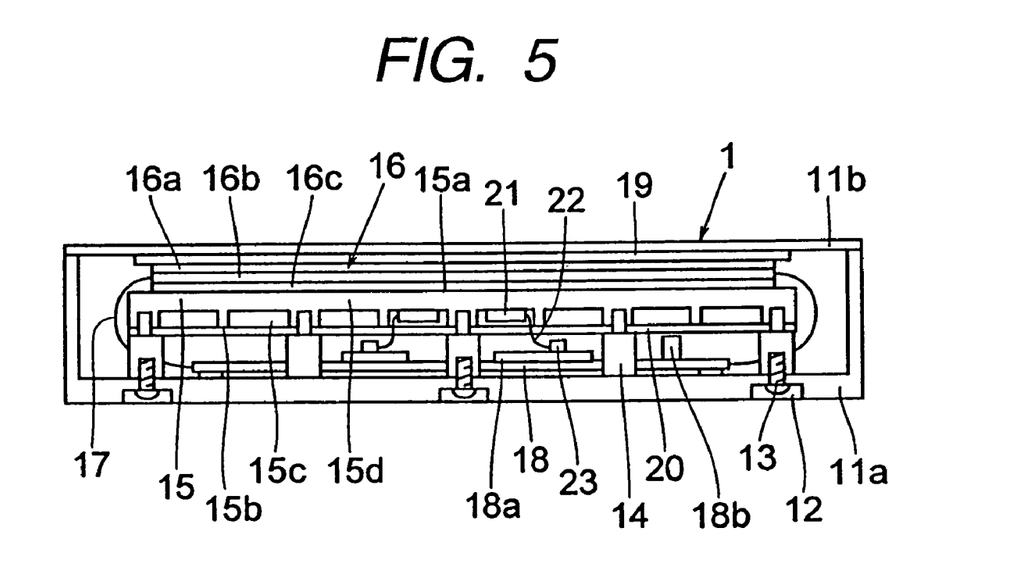
FIG. 5 is a side cross-sectional view illustrating a third embodiment according to the present invention.

FIG. 5 is a cross-sectional view illustrating a third embodiment of the present invention. In the third embodiment, plural sensors 21 are arranged in a divided manner in some of the recess portions 15c formed in the lower portion of the support substrate 15. Those sensors 21 detect the amount of irradiated X-rays, control the X-ray generating apparatus, detect the end of X-ray irradiation, or start the reading of data from the radiation detecting panel 16. The sensors 21 are connected to the circuit board 18 through connecting wires 22 and connectors 23, respectively.

In the third embodiment, through-holes for the connecting wire 22 only need to be formed in the reinforcing plate 20. Accordingly, the reinforcing plate 20 can be advantageously made thin without weakening its physical strength. Sufficiently large electrical signals can be obtained by compounding outputs from the plural sensors 21 on the circuit.

It is hence possible to construct the support substrate for supporting the radiation detecting panel as a hollow structure owing to the presence of the reinforcing plate, and contain the sensor for monitoring X-rays in such a hollow portion, so that the apparatus can be thinned and lightened. Resultantly, the load imposed on the operator and the object can be reduced, and operational conditions for the operator are improved and discomfort of the object is lightened.

Figure 6:
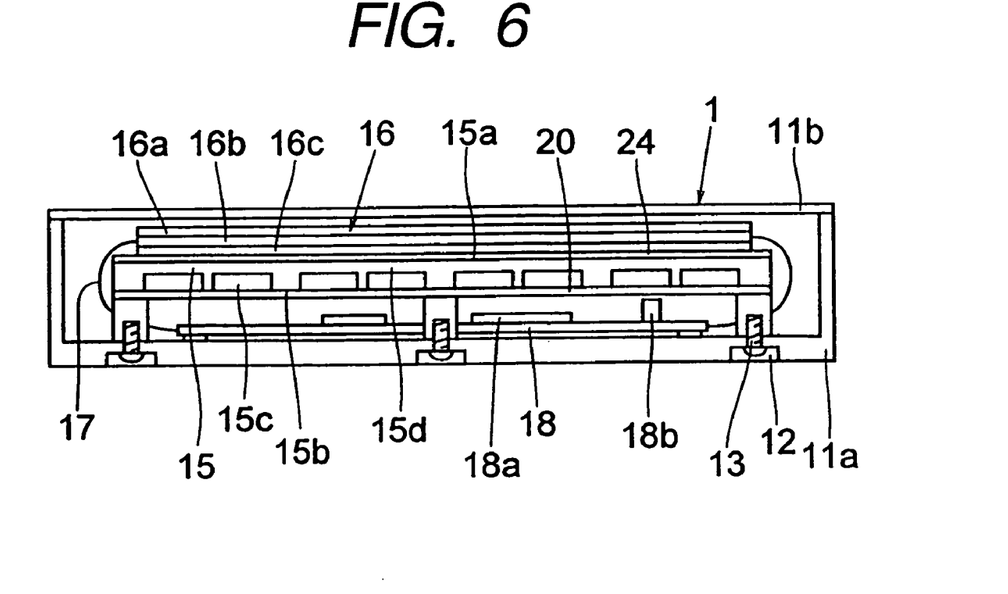
FIG. 6 is a side cross-sectional view illustrating a fourth embodiment according to the present invention.

FIG. 6 is a cross-sectional view illustrating a fourth embodiment of the present invention. In the fourth embodiment, another reinforcing plate 24 is interposed between the radiation detecting panel 16 and the support substrate 15. The reinforcing plate 24 is fixed since it serves as a means for correcting warps of the reinforcing plate 20 and the support substrate 15. It is, however, desirable to mount the reinforcing plate 24 to the radiation detecting panel 16 through a soft bonding layer such that stress can readily escape.

In this case, it is preferable to make the warp-correcting reinforcing plate 24 of fiber-reinforced plastics equivalent to that of the reinforcing plate 20, or material equivalent to linear expansion coefficient with respect to order of magnitude of the reinforcing plate 20 for reinforcement. The linear expansion coefficient of CFRP used for the reinforcing plate 20 is about $2 \times 10^{-6}/°$ C., and so it is desirable to make the warp-correcting reinforcing plate 24 of a material having the linear expansion coefficient of about $n \times 10^{-6}/°$ C. The linear expansion coefficient of aluminum alloy or magnesium alloy used for the support substrate 15 is about $2 \times 10^{-5}$ to $3 \times 10^{-5}/°$ C., and this value is different by one order from the above value. In the event that the reinforcing plate 24 is made of tungsten, tantalum or molybdenum, the linear expansion coefficient thereof is small, for example, about $4 \times 10^{-6}$ to $6 \times 10^{-6}/°$ C.

Owing to such a structure, large warp is unlikely to appear even when the ambient temperature is in a range of $20°$ C.$\pm 40°$ C., and a large bending stress can be prevented from occurring in the radiation detecting panel 16.

On the other hand, tungsten, tantalum and molybdenum are all heavy metals, and their weights are much larger than that of CFRP. However, since they are all heavy metals, their radiation shielding capabilities are high. Accordingly, each of those heavy metals can be used as a shielding means for shielding rays scattered from behind the radiation detecting panel 16. When such a reinforcing plate for correcting thermal expansion is used as a means for preventing the warp, reduction of weight and reliability of environmental resistance can be both achieved.

Furthermore, in the event that heavy metal is employed as the reinforcing plate, the radiation shielding function can also be obtained, and the apparatus can be simplified in its construction, and be somewhat lightened, as compared with a conventional construction with an externally-mounted leaden plate.

Radiation cannot be all absorbed by the fluorescent member 16a, and a portion thereof penetrates the apparatus, and goes outside the apparatus. When such radiation penetrating the apparatus is scattered by the wall, the floor and the like behind the apparatus, it returns from behind the apparatus, and becomes unwanted input which is to be photographed as an image of a structure such as the support substrate 15. To shield such unwanted radiation, it is necessary to arrange a radiation shielding member covering the overall radiation detecting panel 16 therewith, and construct its structure without any slight openings.

Figure 7:
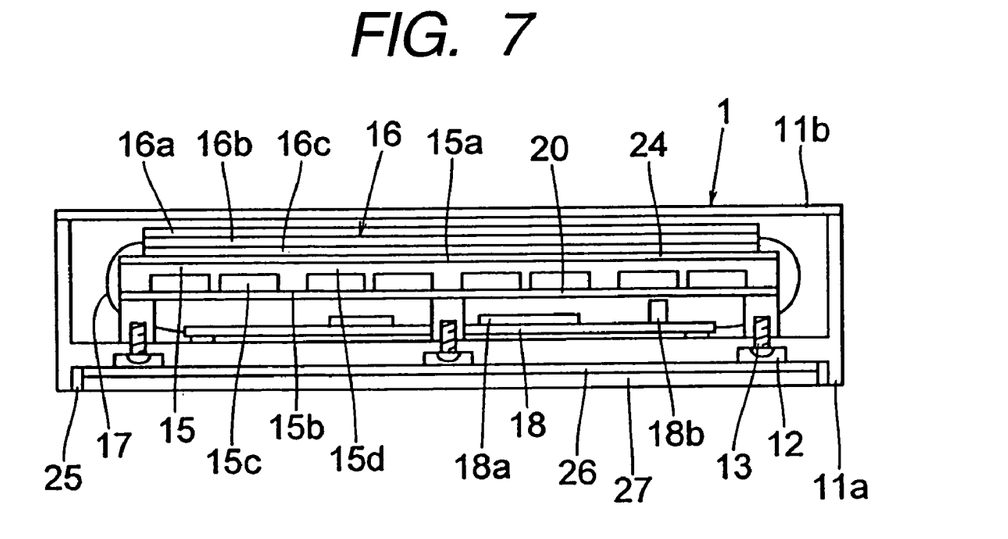
FIG. 7 is a side cross-sectional view illustrating a fifth embodiment according to the present invention.

FIG. 7 is a cross-sectional view illustrating a fifth embodiment of the present invention. In the fifth embodiment, a recess portion 25 is formed over the entire lower surface of the lower housing 11a, the recess portion 25 is lined with a plate-shaped radiation shielding member 26, and the radiation shielding member 26 is covered with an external cover 27, such that the radiation shielding need not depend on inner structures of the support substrate 15 and the lower housing 11a. The radiation shielding member 26 is formed of lead which is generally available at a relatively cheap cost.

As described in the foregoing, the radiation image photographing apparatus according to the present invention can be reduced in its thickness and weight.

The present invention is not limited to the above embodiments, and various changes and modifications can be made within the spirit and scope of the present invention. Therefore to apprise the public of the scope of the present invention, the following claims are made.

What is claimed is:

1. A radiation image photographing apparatus configured to detect radiation, comprising:
   a radiation detecting panel configured to convert received radiation into an electrical signal;
   a support substrate having a plurality of recess portions, configured to support the radiation detecting panel;
   a housing configured to contain the radiation detecting panel and the support substrate;
   a first reinforcing plate configured to reinforce the support substrate; and
   a support member configured to fix the first reinforcing plate at a peripheral frame of the recess portions and to fix the support substrate and the housing.

2. An apparatus according to claim 1, wherein the reinforcing plate is formed of fiber-reinforced plastics, fiber-reinforced metal, or aluminum alloy.

3. An apparatus according to claim 1, wherein an opening is provided in a portion of the reinforcing plate.

4. An apparatus according to claim 3, further comprising a circuit board which is interposed between the reinforcing plate and the side of the housing opposite to incoming radiation, and to which an electrical component configured to control the radiation detecting panel is mounted, and wherein a portion of the electrical component is inserted in the opening of the reinforcing plate.

5. An apparatus according to claim 1, further comprising a sensor configured to detect the amount of radiation,
   wherein the sensor is inserted in the recess portions of the support substrate.

6. An apparatus according to claim 5, wherein the sensor is comprised of a plurality of divided detecting devices, and the detecting devices are inserted in the recess portions which are independently formed.

7. An apparatus according to claim 1, further comprising a second reinforcing plate configured to oppress warp due to a difference between a linear expansion coefficient of the first reinforcing plate and a linear expansion coefficient of the support substrate, and wherein the second reinforcing plate is fixed to the support substrate on the radiation detecting panel side thereof.

8. An apparatus according to claim 7, wherein the linear expansion coefficient of the second reinforcing plate has the same order of magnitude as the linear expansion coefficient of the first reinforcing plate.

9. An apparatus according to claim 7, wherein the second reinforcing plate is formed of fiber-reinforced plastics, tungsten, tantalum, or molybdenum.

10. An apparatus according to claim 7, wherein the second reinforcing plate is a radiation shielding member.

11. An apparatus according to claim 1, wherein the radiation detecting panel is constructed by laminating a fluorescent member configured to convert radiation into visible light, a grid-like optoelectrical converting device configured to convert the visible light into an electrical signal, and a substrate on a surface of which the optoelectrical converting device is formed.

12. An apparatus according to claim 1, wherein a surface configured to support the radiation detecting panel of the support substrate is made flat.

* * * * *

UNITED STATES PATENT AND TRADEMARK OFFICE
CERTIFICATE OF CORRECTION

PATENT NO.       : 7,397,037 B2                                    Page 1 of 1
APPLICATION NO.  : 11/356014
DATED            : July 8, 2008
INVENTOR(S)      : Tetsuo Watanabe It is certified that error appears in the above-identified patent and that said Letters Patent is hereby corrected as shown below:

<u>COLUMN 2</u>:

Line 18, "oppress" should read --suppress--.

<u>COLUMN 4</u>:

Line 39, "oppressed" should read --suppressed--.

Signed and Sealed this

Twenty-first Day of April, 2009

JOHN DOLL
*Acting Director of the United States Patent and Trademark Office*